(12) United States Patent
Dave (10) Patent No.: US 6,850,704 B1
(45) Date of Patent: Feb. 1, 2005

(54) LOW-OVERHEAD FAULT-TOLERANCE TECHNIQUES FOR OPTICAL AND OTHER CROSS-CONNECT SYSTEMS

(75) Inventor: Bharat P. Dave, Howell, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 545 days.

(21) Appl. No.: 09/614,436

(22) Filed: Jul. 12, 2000

Related U.S. Application Data
(60) Provisional application No. 60/153,880, filed on Sep. 14, 1999.

(51) Int. Cl.[7] .......................... H04B 10/08; H04L 1/22; G01R 31/08; G06F 11/18; H03M 13/03
(52) U.S. Cl. ............................. 398/2; 398/1; 398/12; 398/19; 370/217; 370/220; 370/244; 714/3; 714/25; 714/48; 714/820; 714/822
(58) Field of Search .................... 359/110, 117, 359/128, 139, 135; 370/220, 217, 360, 389, 411; 714/821, 797, 766, 820, 822, 823, 824, 819

(56) References Cited

U.S. PATENT DOCUMENTS

| | | | | |
|---|---|---|---|---|
| 4,535,442 A | * | 8/1985 | Maddern et al. ............. | 370/220 |
| 4,706,240 A | * | 11/1987 | Payne, III ..................... | 370/360 |
| 5,107,361 A | * | 4/1992 | Kneidinger et al. ......... | 359/135 |
| 5,130,974 A | * | 7/1992 | Kawamura et al. .......... | 370/217 |
| 5,450,397 A | * | 9/1995 | Wahlman ...................... | 370/411 |
| 5,485,453 A | * | 1/1996 | Wahlman et al. ............ | 370/389 |
| 6,072,610 A | * | 6/2000 | Kuroyanagi et al. ......... | 359/117 |
| 6,362,905 B1 | * | 3/2002 | Fukashiro et al. ........... | 359/128 |
| 6,433,900 B1 | * | 8/2002 | Kuroyanagi et al. ......... | 359/110 |

OTHER PUBLICATIONS

Thuppal, R. and R. Venkatesan. "Design and implementation of control plane and data plane ASICs for pipelined banyan network." IEEE Canadian Conference on Electrical and Computer Engineering, 1998. May 24–28, 1998: 241–244 vol. 1.*

Venkatesan, R. et al. "Pipelined balanced gamma network for broadband communications switch fabrics." IEEE 1997 Canadian Conference on Electrical and Computer Engineering, 1997, May 25–28, 1997: 680–683 vol. 2.*

* cited by examiner

Primary Examiner—M. R. Sedighian
Assistant Examiner—David S Kim

(57) ABSTRACT

Fault tolerance is provided in a cross-connect system having only duplicated switch fabrics, instead of the triplicated switch fabrics of the prior art. In addition to the two information switch fabrics, the cross-connect system has a relatively small code switch fabric which switches check-code signals generated at each input interface for each input signal sent to an information switch fabric. Fault-detection and error-recovery components in each output interface (1) generate local check-code signals for each outgoing signals received from an information switch fabric and (2) compare those local check-code signals to the corresponding check-code signal received from the code switch fabric to detect a failure and to select a healthy signal as the output signal for that output interface. In one embodiment, input and output interfaces are clustered, and the corresponding input and output check-code signals are multiplexed, for even greater savings in overhead (e.g., fewer check-code cables to and from the code switch fabric).

15 Claims, 6 Drawing Sheets

LOW-OVERHEAD FAULT-TOLERANCE TECHNIQUES FOR OPTICAL AND OTHER CROSS-CONNECT SYSTEMS

CROSS-REFERENCE TO RELATED APPLICATIONS

This application claims the benefit of the filing date of U.S. provisional application No. 60/153,880, filed on Sep. 14, 1999.

BACKGROUND OF THE INVENTION

1. Field of the Invention

The present invention relates to communication systems, and, in particular, to fault-tolerant switches used to route signals in optical telecommunication systems.

2. Description of the Related Art

Optical cross-connect systems will play a very important role in high-speed communication networks as optical technology is deployed. An optical channel can carry terabits of information per second. On the other hand, as bit rate increases, tolerance for signal interruption significantly decreases. For example, a 50-ms interruption in a DS-1 signal (having a bit rate of 1.544 Mb/s) will cause a loss of 77,200 bits of information. However, when an optical channel is carrying an OC-192 signal (having a bit rate of 9.92 Gb/s), a similar 50-ms signal interruption will cause a loss of 496 million bits! If an optical channel is employing dense wavelength division to multiplex N different wavelengths, each carrying 9.92 Gb/s seconds, then the loss of information bits further increases N-fold. In many applications, it is very important that there are no transmission errors, even in the presence of single-point equipment failures.

Figure 1:
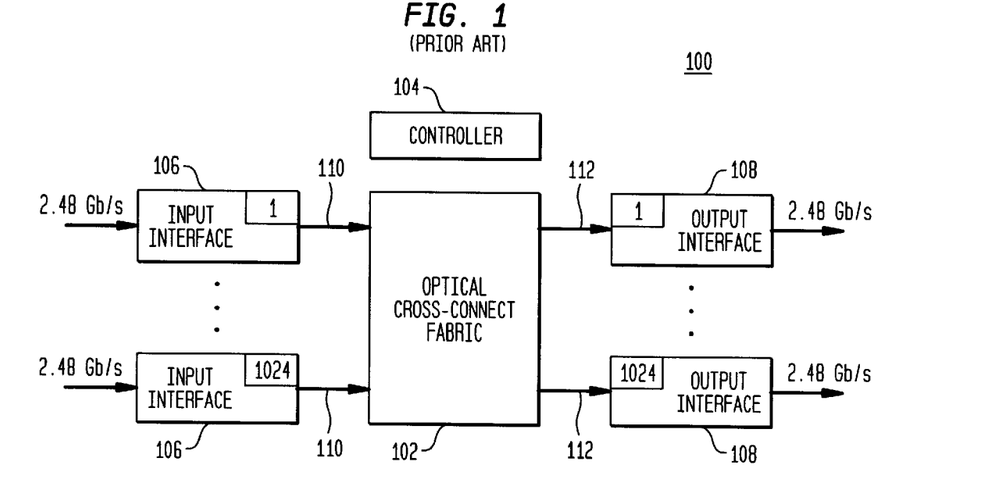
FIG. 1 shows a high-level block diagram of an optical cross-connect system.

FIG. 1 shows a high-level block diagram of an optical cross-connect system 100, comprising an optical cross-connect switch fabric 102 configured to a controller 104, 1024 STS-48 input interfaces 106, and 1024 STS-48 output interfaces 108. Each input interface 106 transmits its input signal to switch fabric 102 via a different input optical fiber 110. Similarly, switch fabric 102 transmits a different output signal to a corresponding output interface 108 via a different output optical fiber 112. Each of the 1024 input signals can be connected to any of the 1024 output signals in a non-blocking manner. Controller 104 provides the configuration information to switch fabric 102 such that each signal is routed to the correct output interface 108.

As evident from FIG. 1, if any fiber (110 or 112) or any switching element (within switch fabric 102) fails, the corresponding signal(s) will be interrupted until the fault is repaired. In order to provide error-less transmission in the event of such a single-point failure, traditional fault-tolerance techniques require a triplicated switch fabric.

Figure 2:
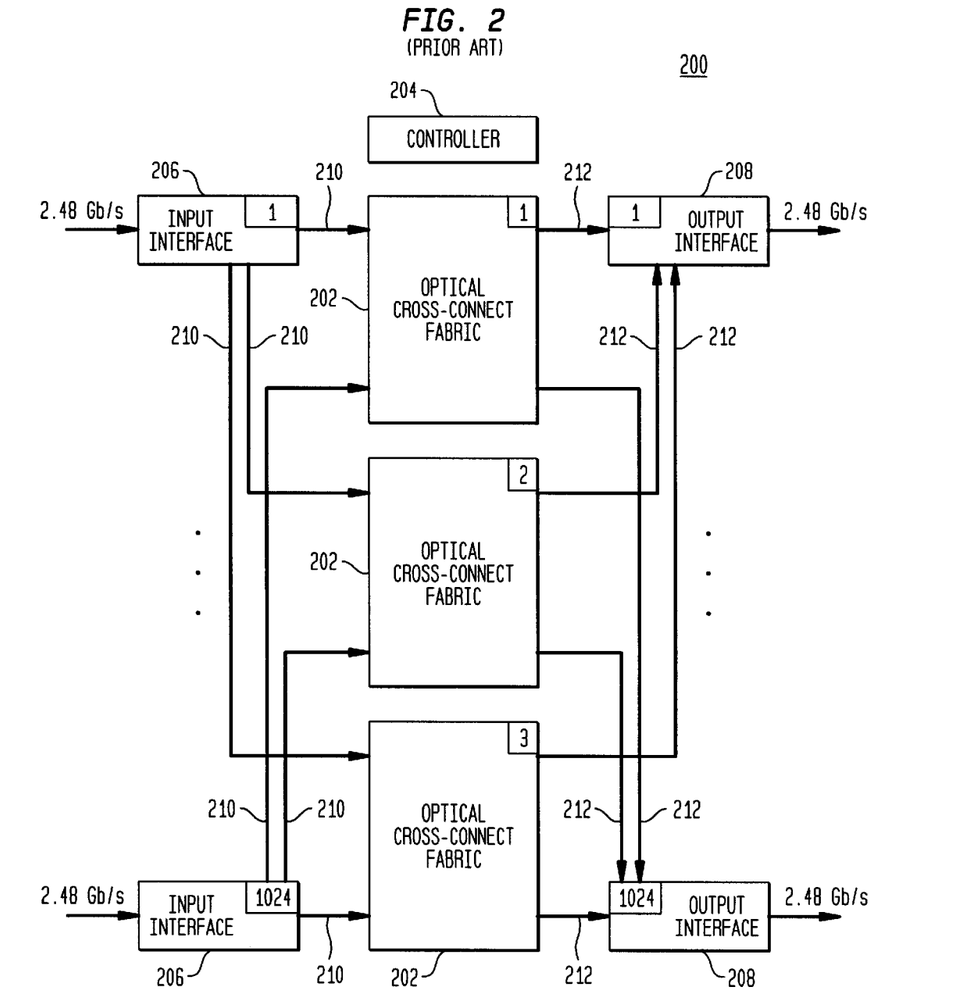
FIG. 2 shows a block diagram of an optical cross-connect system configured with a conventional triplicated switch fabric to provide fault tolerance for error-less switching.

FIG. 2 shows a block diagram of an optical cross-connect system 200 configured with a conventional triplicated switch fabric to provide fault tolerance for error-less switching. In particular, optical cross-connect system 200 comprises three optical cross-connect switch fabrics 202, each configured to a controller 204, 1024 STS-48 input interfaces 206, and 1024 STS-48 output interfaces 208. As shown in FIG. 2, the input signal from each input interface 206 is transmitted to each of the three switch fabrics 202 via three different input fibers 210 and each output interface 208 receives an output signal from each of the three switch fabrics 202 via a different output fiber 212. According to this traditional fault-tolerance technique, each output interface 208 implements a fault-detection and error-recovery scheme to produce an appropriate output signal.

Figure 3:
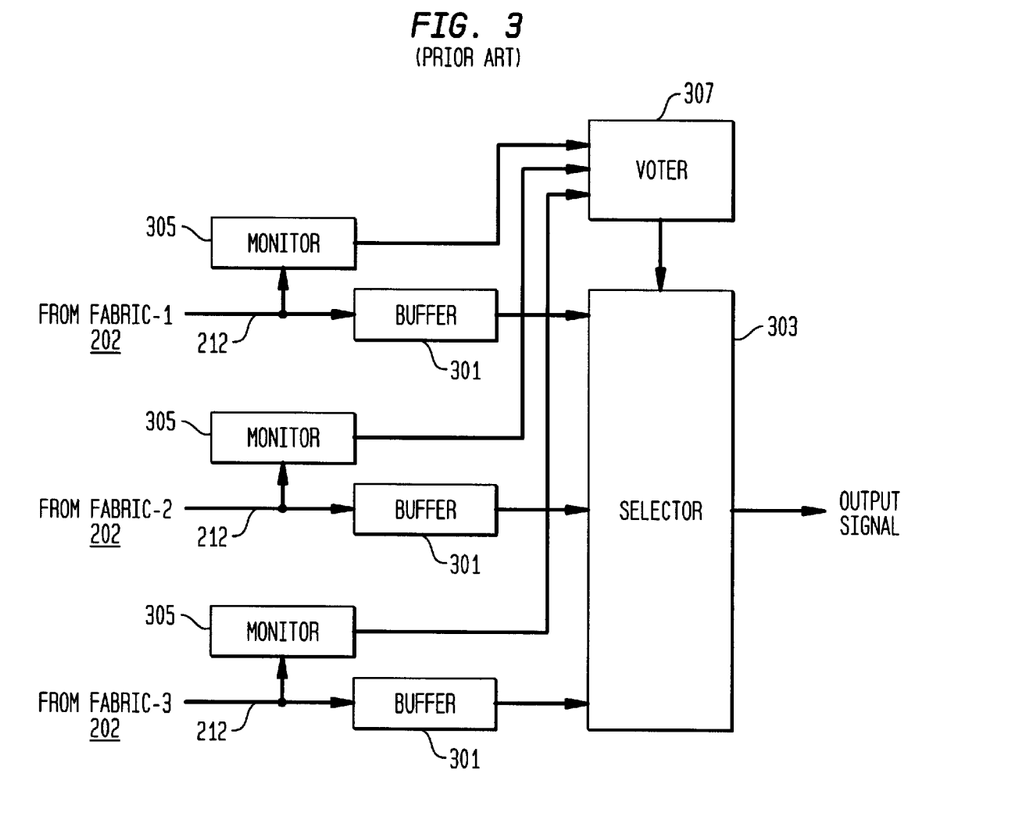
FIG. 3 shows a block diagram of the components used to implement the fault-detection and error-recovery scheme in each output interface of FIG. 2.

FIG. 3 shows a block diagram of the components used to implement the fault-detection and error-recovery scheme within each output interface 208 of FIG. 2. In particular, each output signal is routed via output optical fiber 212 through a buffer 301 to a selector 303. In addition, there are three independent monitors 305, each of which monitors the corresponding output signal for failure (e.g., a signal open or a signal short). A voter 307 monitors the status of the signals and causes selector 303 to select a healthy signal from the three incoming signals as the output signal for the corresponding output interface 208. The health of a signal is determined by majority voting. In the event of failure in one signal, information from two healthy signals will match and voter 307 will cause selector 303 to select one of the healthy signals for transmission.

As indicated by FIGS. 2 and 3, traditional fault-tolerance techniques require three switch fabrics with three different sets of incoming and outgoing fiber cables. In addition, for error-less switching, the traditional techniques require sufficient storage (i.e., buffering) for each of the three signals, to enable a fault to be detected before the selected output signal leaves the system. As such, these traditional fault-tolerance techniques require a relatively large overhead to achieve error-less switching.

SUMMARY OF THE INVENTION

The present invention is directed to fault-tolerance techniques having lower overhead than traditional techniques which require triplicated switch fabrics, triplicated fiber cables, and triplicated buffering to achieve error-less switching. The present invention, on the other hand, employs only a duplicated switch fabric and a small amount of storage to ensure error-less transmission in the event of equipment failure or a fiber cut. In one embodiment, a small electronic byte slice switch is used to transport check bytes for facilitating fast fault detection with a relatively small amount of storage required. As such, the present invention can provide large savings in equipment cost.

In one embodiment, the present invention is a cross-connect system, comprising (a) two information switch fabrics; (b) a plurality of input interfaces, each of which is coupled to transmit an input information signal to each of the two information switch fabrics; (c) a plurality of output interfaces, each of which is coupled to receive an output information signal from each of the two information switch fabrics; and (d) a code switch fabric, coupled to receive an input check-code signal from each input interface corresponding to the corresponding input information signal and to transmit an output check-code signal to the corresponding output interface. Each output interface generates a local check-code signal for an output information signal and compares the local check-code signal to the output check-code signal to select one of the two output information signals as an output signal for the output interface.

In another embodiment, the present invention is a method for switching signals in a cross-connect system, comprising the steps of (a) generating an input check-code signal for each input information signal; (b) routing each input information signal through two information switch fabrics to generate two output information signals for the input information signal; (c) routing the input check-code signal through a code switch fabric to generate an output check-code signal; (d) generating a local check-code signal for an output information signal; and (e) comparing the output check-code signal to the local check-code signal to select one of the two output information signals as an output signal corresponding to the input information signal.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 4:
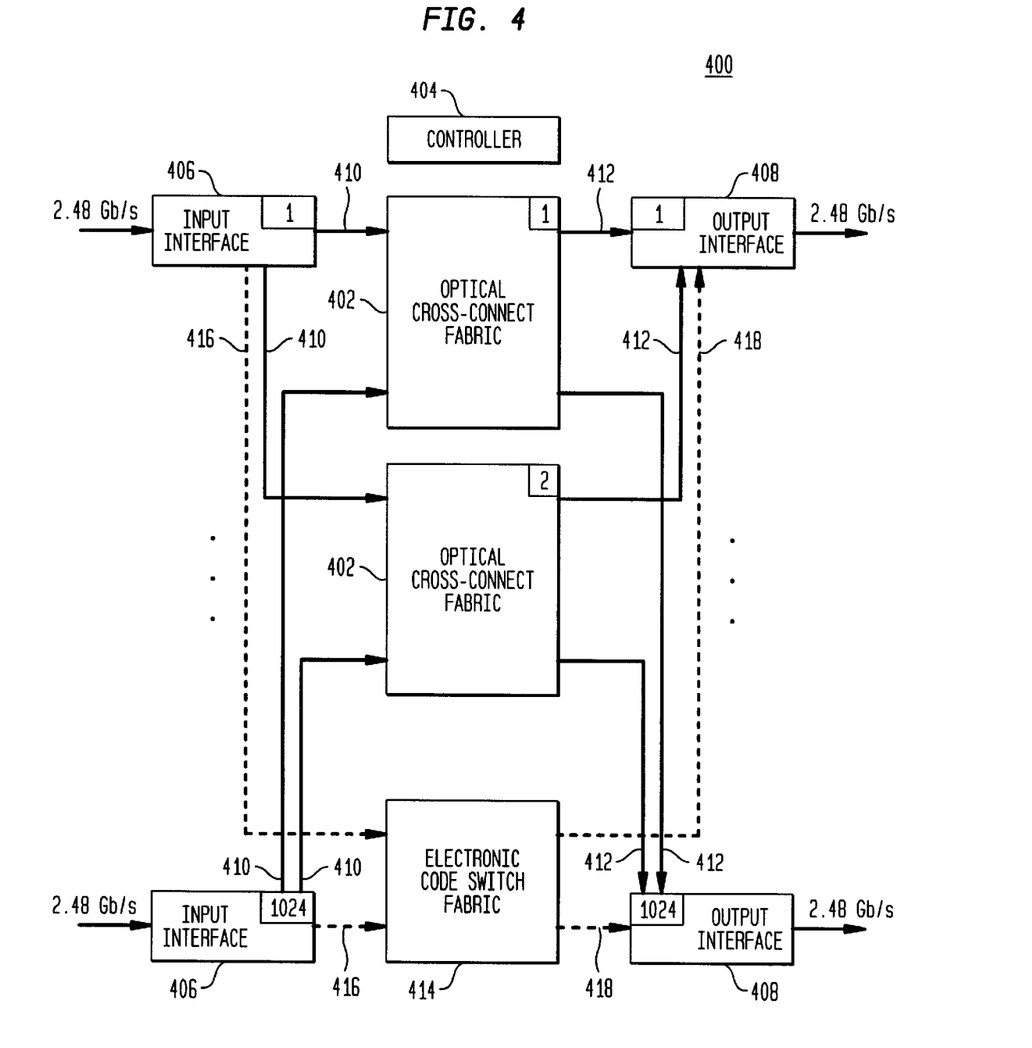
FIG. 4 shows a block diagram of an optical cross-connect system, according to one embodiment of the present invention.

FIG. 4 shows a block diagram of an optical cross-connect system 400, according to one embodiment of the present invention. Optical cross-connect system 400 comprises two optical cross-connect information switch fabrics 402, each configured to a controller 404, 1024 STS-48 input interfaces 406, and 1024 STS-48 output interfaces 408, where the input information signal from each input interface 406 is transmitted to each of the two information switch fabrics 402 via two different input optical fibers 410 and each output interface 408 receives an output information signal from each of the two information switch fabrics 402 via a different output optical fiber 412. Each information switch fabric 402 in optical cross-connect system 400 routes optical information signals in a manner analogous to that implemented by each switch fabric 202 of optical cross-connect system 200 of FIG. 2.

In addition, optical cross-connect system 400 implements a code-based fault-detection and error-recovery scheme to achieve error-less switching in the event of a switch failure or a fiber cut. To implement this fault-tolerance scheme, optical cross-connect system 400 further comprises a code switch fabric 414, configured to controller 404 and further configured to receive an input check-code signal 416 from each input interface 406 and to transmit an output check-code signal 418 to each output interface 408. In a preferred embodiment, code switch fabric 414 is an electronic switch fabric, although, in alternative embodiments, code switch fabric 414 may be an optical switch fabric, similar to the two optical cross-connect information switch fabrics 402.

According to the fault-tolerance scheme of optical cross-connect system 400, each input interface 406 generates an input check-code signal 416 based on its corresponding input information signal. The present invention can be implemented using any one of a variety of different suitable coding techniques, such as parity codes, checksum codes, CRC (cyclic redundancy check) codes, Reed-Solomon codes, or BCH (Bose Chaudhary) codes, to name a few. In one embodiment, a check-code word is generated for every 12 information data words. The different input check-code signals 416 are multiplexed and transported through code switch fabric 414, which then transmits the corresponding output check-code signals 418 to the appropriate output interfaces 408. According to one embodiment of the present invention, the input and output interfaces 406 and 408 are clustered to enable efficient multiplexing of the various input and output check-code signals.

Figure 5:
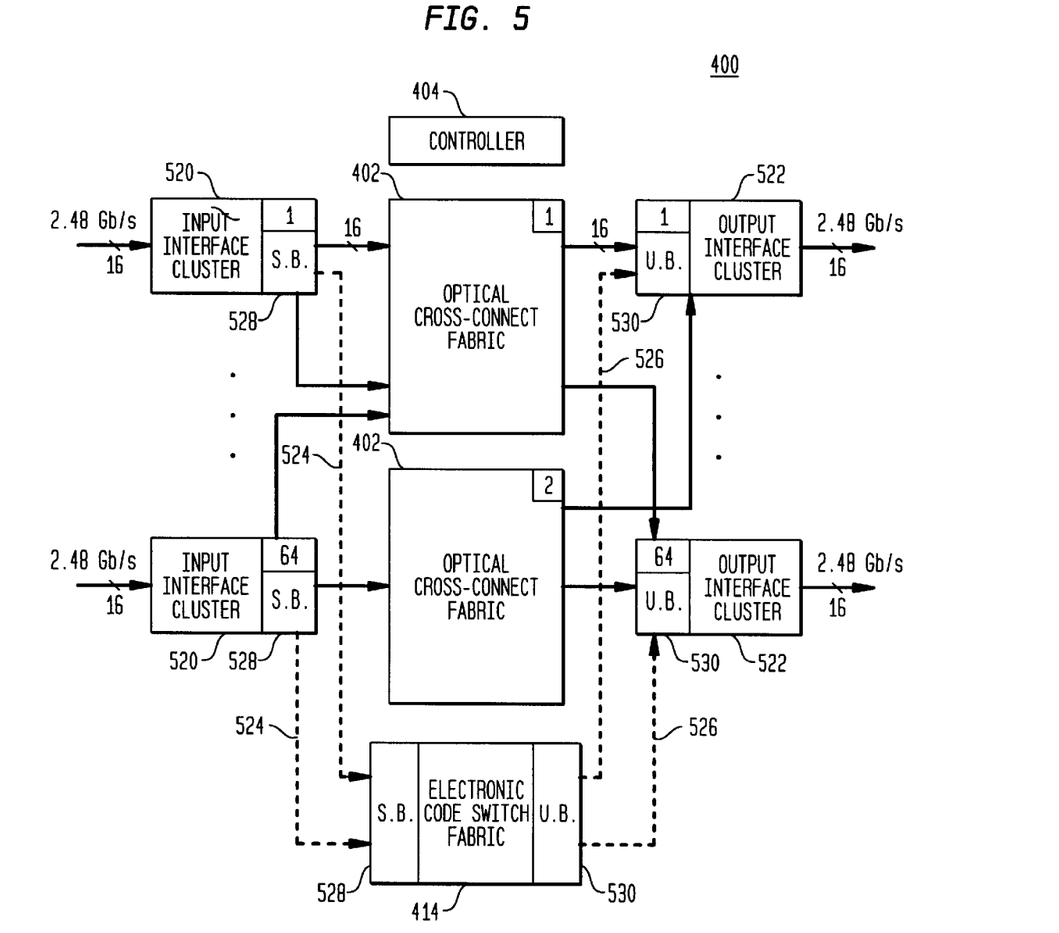
FIG. 5 shows a block diagram illustrating the clustering scheme for the optical cross-connect system of FIG. 4.

FIG. 5 shows a block diagram illustrating the clustering scheme for optical cross-connect system 400, according to one embodiment of the present invention. According to this clustering scheme, the 1024 input interfaces 406 of FIG. 4 are clustered into 64 input interface clusters 520, each having a different set of 16 input interfaces 406. Similarly, the 1024 output interfaces 408 are clustered into 64 output interface clusters 522, each having a different set of 16 input interfaces 408. The 16 different input check-code signals 416 from each input interface cluster 520 are multiplexed together into a multiplexed input check-code signal that is transmitted over a single input cable 524 to electronic code switch fabric 414. Similarly, code switch fabric 414 transmits a multiplexed output check-code signal over a single output cable 526 to each output interface cluster 522, where each multiplexed output check-code signal comprises the 16 corresponding output check-code signals 418 multiplexed together. As such, optical cross-connect system 400 requires only 64 input cables and only 64 output cables to and from code switch fabric 414 to support all 1024 input check-code signals and all 1024 output check-code signals, respectively. In one embodiment, code switch fabric 414 demultiplexes all of the check bytes in each multiplexed input check-code signal and rearranges the bytes for the 16 STS-48 check-code signals targeted for the same output interface cluster 522 onto one STS-48 check-code signal for routing through code switch fabric 414.

Figure 6:
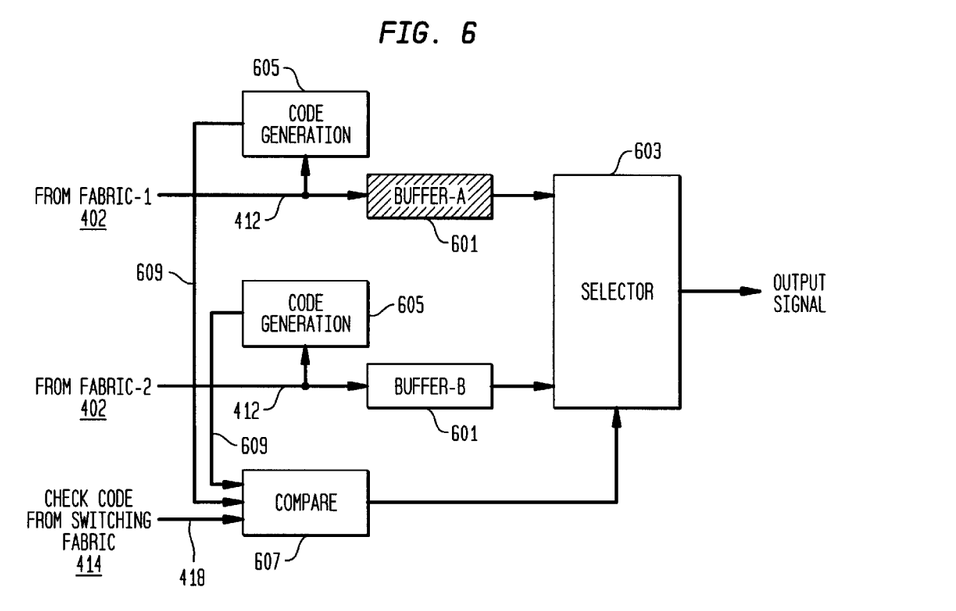
FIG. 6 shows a block diagram of the components used to implement the fault-detection and error-recovery scheme in each output interface cluster of FIG. 5.

FIG. 6 shows a block diagram of the components used to implement the fault-detection and error-recovery scheme within each output interface cluster 522 of FIG. 5, according to one embodiment of the present invention. In particular, each corresponding output information signal from the two information switch fabrics 402 is routed via corresponding output optical fiber 412 through a buffer 601 to a selector 603. In addition, there are two independent code-generation modules 605, which perform the same code-generation processing on the corresponding output information signal that was performed on the corresponding input information signal in the corresponding input interface 406 of FIG. 4. The resulting local check-code signals 609 are transmitted, along with the corresponding output check-code signal 418 received from code switch fabric 414, to a compare module 607, which compares the check codes in output check-code signal 418 with the two local check-code signals 609 to determine if either of them is in error.

If, for example, there is a failure in one of the information switch fabrics 402 or one of its associated fibers 410 or 412, then there will be an error in the information bits stored in the corresponding buffer 601. As a result, the local check-code signal 609 generated by the corresponding code-generation module 605 will not match the check-code signal 418 received from code switch fabric 414. Compare module 607 will detect the mismatch and cause selector 603 to select the other output information signal in the other buffer 601 as the appropriate output signal to transmit, thereby ensuring error-less transmission of information.

In the event of failure in the path carrying the corresponding check-code signal 418 through code switch fabric 414, the two local check-code signals 609 will match with each other, but not with check-code signal 418 received from code switch fabric 414. In that case, no protection switching needs to be performed.

Delay Management

Figure 7:
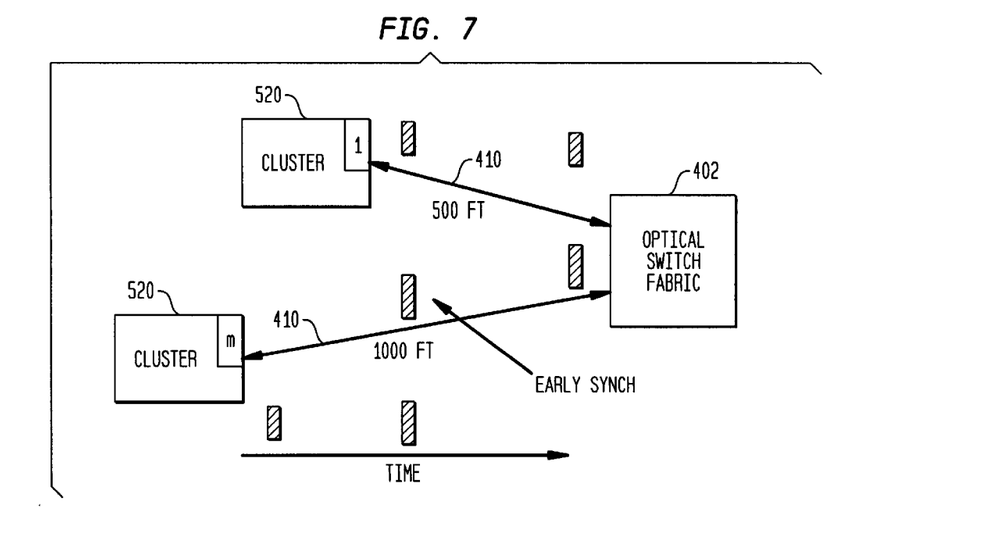
FIG. 7 shows a block diagram illustrating the delay management technique for the system of FIGS. 4–6.

In order to control the storage requirement for each of the two buffers 601 of FIG. 6, data arrival for the various interface clusters should be synchronous. As described earlier, 1024 signals are grouped into 64 interface clusters, where the interface clusters are preferably optically remoted from the two information switch fabrics 402. As shown in FIG. 7, Input Cluster 1 520 and Input Cluster m 520 may be located at different distances from an optical information switch fabric 402. In order to ensure that data at buffers 601 are aligned, data at the input of each optical information switch fabric 402 should be aligned. This objective may be achieved using, at least, two different approaches.

In one approach, the fiber cable lengths between each interface cluster and the switch fabric are made substantially equal. Another approach is to employ position-dependent sync management. The first approach may require a relatively large amount of cable storage. The second approach is preferred due to the elimination of storage for fiber slack.

According to the second approach, during installation as part of set up, a test frame is sent to the switch fabric and looped back. The distance is then calculated based on the round-trip delay. Based on the round-trip delay, the corresponding frame sync pulse is appropriately delayed. For example, assume that Cluster 1 has a 500-ft cable distance from the optical information switch fabric 402 and Cluster m has a 1000-ft cable distance. Since Cluster 1 is closer to the switch fabric, its frame sync pulse is appropriately delayed compared to that of Cluster m to ensure that the corresponding output data are aligned when they arrive at the output buffers 601

Information and Check-Code Alignment

In one implementation of the present invention, each STS-48 input signal is demultiplexed into four TXI signals (each having a bit rate of 622 Mb/s). Table I shows the byte order for the four TXI signals relative to each STS-48 signal. Table II shows the alignment of the check codes. Note that C1 is calculated over the first 16 bytes, C2 is calculated over the next 16 bytes, and C3 is calculated over the remaining 16 bytes.

TABLE I

Byte order on incoming TXI signals

| TXI-1 | 1 | 4 | 7 | 10 | 2 | 5 | 8 | 11 | 3 | 6 | 9 | 12 |
|---|---|---|---|---|---|---|---|---|---|---|---|---|
| TXI-2 | 13 | 16 | 19 | 22 | 14 | 17 | 20 | 23 | 15 | 18 | 21 | 24 |
| TXI-3 | 25 | 28 | 31 | 34 | 26 | 29 | 32 | 35 | 27 | 30 | 33 | 36 |
| TXI-4 | 37 | 40 | 43 | 46 | 38 | 41 | 44 | 47 | 39 | 42 | 45 | 48 |

TABLE II

Byte order for check codes

| TXI-1 | 1 | 4 | 7 | 10 | 2 | 5 | 8 | 11 | 3 | 6 | 9 | 12 |
|---|---|---|---|---|---|---|---|---|---|---|---|---|
| TXI-2 | 13 | 16 | 19 | 22 | 14 | 17 | 20 | 23 | 15 | 18 | 21 | 24 |
| TXI-3 | 25 | 28 | 31 | 34 | 26 | 29 | 32 | 35 | 27 | 30 | 33 | 36 |
| TXI-4 | 37 | 40 | 43 | 46 | 38 | 41 | 44 | 47 | 39 | 42 | 45 | 48 |
| TXI-C | | | | C1 | | | | C2 | | | | C3 |

According to preferred implementations of the present invention, the order of bytes in sets of signals is rearranged by shuffle blocks prior to routing through the switch fabrics. The original order of bytes is then restored by un-shuffle blocks after the shuffled signals are routed through the switch fabrics. In one implementation, shuffle blocks (S.B.) 528 are implemented in input interface clusters 520 as well as at the input of code switch fabric 414, while un-shuffle blocks (U.B.) 530 are implemented in output interface clusters 522 as well as at the output of code switch fabric 414.

Table III shows the alignment of check bytes before a shuffle block for four different STS-48 signals. Each shuffle block takes as an input four code TXI from four different STS-48 signals and creates one TXI as shown in Table IV. For example, a first shuffle block takes as an input [1–]-TXI-C signals shown in Table III and generates a G1-TXI-C signal as shown in Table 4. Analogously, three other shuffle blocks generate corresponding TXI signals for the remaining 12 STS-48 signals as [G2–G4]-TXI-C. These four TXIs are then multiplexed to generate one STS-48 check-code signal.

TABLE III

Byte order for check bytes

| 1-TXI-C | 1, C1 | 1, C2 | 1, C3 |
|---|---|---|---|
| 2-TXI-C | 2, C1 | 2, C2 | 2, C3 |
| 3-TXI-C | 3, C1 | 3, C2 | 3, C3 |
| 4-TXI-C | 4, C1 | 4, C2 | 4, C3 |

TABLE IV

Byte order for check bytes

| G1-TXI-C | 1, C1 | 2, C1 | 3, C1 | 4, C1 | 1, C2 | 2, C2 | 3, C2 | 4, C2 | 1, C3 | 2, C3 | 3, C3 | 4, C3 |
|---|---|---|---|---|---|---|---|---|---|---|---|---|
| G2-TXI-C | 5, C1 | 6, C1 | 7, C1 | 8, C1 | 5, C2 | 6, C2 | 7, C2 | 8, C2 | 5, C3 | 6, C3 | 7, C3 | 8, C3 |
| G3-TXI-C | 9, C1 | 10, C1 | 11, C1 | 12, C1 | 9, C2 | 10, C2 | 11, C2 | 12, C2 | 9, C3 | 10, C3 | 11, C3 | 12, C3 |
| G4-TXI-C | 13, C1 | 14, C1 | 15, C1 | 16, C1 | 13, C2 | 14, C2 | 15, C2 | 16, C2 | 13, C3 | 14, C3 | 15, C3 | 16, C3 |

Fault-Tolerance Overhead Savings

Table V shows the overhead involved in the prior-art fault-tolerance scheme of FIGS. 2–3 as compared with the overhead involved in the fault-tolerance scheme of FIGS. 4–6 of the present invention, for three different types of optical cross-connect (XCON) systems (i.e., having different numbers of input and output interfaces). In addition to eliminating an entire optical cross-connect switch fabric (at the expense of adding a relatively small electrical code switch fabric), as indicated in Table V, the present invention provides significant overhead savings in terms of number of fibers and power dissipation with only a slight increase in buffer storage requirements. Power dissipation values in Table V are estimated based on currently available system data.

TABLE V

Comparison of Prior Art and Invention

| | Prior Art | | | Invention | | |
|---|---|---|---|---|---|---|
| Type of System | Number of Fibers | Buffer Storage (Bytes) | Power Dissipation (Watts) | Number of Fibers | Buffer Storage (Bytes) | Power Dissipation (Watts) |
| 256 × 256 STS-48 XCON | 1536 | 4 | 3000 | 1056 | 16 | 2100 |
| 512 × 512 STS-48 XCON | 3072 | 4 | 6000 | 2112 | 16 | 4200 |
| 1024 × 1024 STS-48 XCON | 6144 | 4 | 12000 | 4224 | 16 | 8400 |

The low-overhead fault-tolerance technique of the present invention is very effective in offering error-less transmission for optical cross-connect systems with significant reduction in number of cables as well as total system power dissipation. As the capacity of systems increase, the fault-tolerance overhead savings increase even more with the present invention.

Although the fault-detection and error-recovery processing shown in FIG. 6 shows two code generation modules 605 generating two local check-code signals 609, one for each output information signal stored in a different buffer 601, those skilled in the art will understand that the present invention could be implemented with a single code generation module that generates only one local check-code signal (e.g., for the currently selected "working" signal) and that, if a failure is detected in that one local check-code signal, then protection switching will occur to select the other "protection" signal as the output signal. Such an embodiment might not be preferred (e.g., unnecessary, but harmless protection switching will occur in the event of a failure in the code-check signal path), but it is nevertheless feasible and may even provide even lower fault-tolerance overhead.

Although the present invention has been described in the context of a system that provides error-less switching, other applications, such as switching of voice signals, may require only hitless switching (in which some errors can be tolerated). For those applications, the present invention can be implemented with less, or even no, buffering, depending on the system requirements.

In an alternative embodiment, electronic code switch fabric 414 of system 400 can itself be duplicated to further increase the reliability of the fault-detection scheme of the present invention without much increase in fault-tolerance overhead.

Although the present invention has been described in the context of an optical cross-connect system having 1024 input interfaces and 1024 output interfaces each supporting a 2.48 Gb/s STS-48 optical signal, those skilled in the art will understand that the present invention can be implemented in optical cross-connect systems having numbers of input and output interfaces different from 1024 and/or that support types of signals other than STS-48 signals, as well as in systems where one or more of the interfaces function as both input and output interfaces.

Moreover, although the present invention has been described in the context of optical cross-connect systems employing optical cross-connect switch fabrics, those skilled in the art will understand that the fault-tolerance techniques of the present invention can be implemented in cross-connect systems other than optical cross-connect systems, such as traditional electrical cross-connect systems employing electrical switch elements instead of optical switch elements.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A cross-connect system, comprising:
   (a) two information switch fabrics;
   (b) a plurality of input interfaces, each of which is coupled to transmit an input information signal to each of the two information switch fabrics;
   (c) a plurality of output interfaces, each of which is coupled to receive an output information signal from each of the two information switch fabrics; and
   (d) a code switch fabric, coupled to receive an input check-code signal from each input interface corresponding to the corresponding input information signal and to transmit an output check-code signal to the corresponding output interface, wherein:
   total number of all input check-code signal bits based on each portion of the corresponding input information signal is smaller than the total number of bits in said each portion;
   the code switch fabric has a smaller data size than each of the two information switch fabrics; and
   each output interface generates a local check-code signal for an output information signal and compares the local check-code signal to the output check-code signal to select one of the two output information signals as an output signal for the output interface.

2. The invention of claim 1, wherein each output interface generates a local check-code signal for each of the two output information signals and compares the two local check-code signals to the output check-code signal to select one of the two output information signals as the output signal for the output interface.

3. The invention of claim 1, wherein:
   the two information switch fabrics are optical switch fabrics; and
   the code switch fabric is an electrical switch fabric.

4. The invention of claim 1, wherein:
   one or more sets of two or more input interfaces are clustered together to form one or more input interface clusters, wherein the input check-code signals from the two or more input interfaces of each input interface cluster are multiplexed together for transmission from the input interface cluster to the code switch fabric over a single input cable; and one or more sets of two or more output interfaces are clustered together to form one or more output interface clusters, wherein the output check-code signals for the two or more output interfaces of each output interface cluster are multiplexed together for transmission from the code switch fabric to the output interface cluster over a single output cable.

5. The invention of claim 1, wherein two or more input check-code signals are shuffled together prior to routing through the code switch fabric.

6. The invention of claim 1, wherein each output interface comprises:
   (1) two buffers, each coupled to receive an output information signal from a different information switch fabric;
   (2) two code generation modules, each configured to generate a local check-code signals for a different output information signal;
   (3) a compare module configured to compare the two local check-code signals with the output check-code signal received from the code switch fabric; and
   (4) a selector configured to select one of the two output information signals as the output signal for the output interface based on the comparison by the compare module.

7. The invention of claim 1, wherein signals from different input interfaces are differently delayed to account for differences in distance between the input interfaces and the switch fabrics and between the switch fabrics and the output interfaces.

8. The invention of claim 1, wherein:
   the two information switch fabrics are optical switch fabrics;
   the code switch fabric is an electrical switch fabric;
   one or more sets of two or more input interfaces are clustered together to form one or more input interface clusters, wherein the input check-code signals from the two or more input interfaces of each input interface cluster are multiplexed together for transmission from the input interface cluster to the code switch fabric over a single input cable;
   one or more sets of two or more output interfaces are clustered together to form one or more output interface clusters, wherein the output check-code signals for the two or more output interfaces of each output interface cluster are multiplexed together for transmission from the code switch fabric to the output interface cluster over a single output cable;
   two or more input-check-code signals are shuffled together prior to routing through the code switch fabric;
   each output interface comprises:
   (1) two buffers, each coupled to receive an output information signal from a different information switch fabric;
   (2) two code generation modules, each configured to generate a local check-code signals for a different output information signal;
   (3) a compare module configured to compare the two local check-code signals with the output check-code signal received from the code switch fabric; and
   (4) a selector configured to select one of the two output information signals as the output signal for the output interface based on the comparison by the compare module; and
   signals from different input interfaces are differently delayed to account for differences in distance between the input interfaces and the switch fabrics and between the switch fabrics and the output interfaces.

9. A method for switching signals in a cross-connect system, comprising the steps of:
   (a) generating an input check-code signal for each input information signal, the total number of all input check-code signal bits based on each portion of the corresponding input information signal is smaller than the total number of bits in said each portion;
   (b) routing each input information signal through two information switch fabrics to generate two output information signals for the input information signal;
   (c) routing the input check-code signal through a code switch fabric to generate an output check-code signal, wherein the code switch fabric has a smaller data size than each of the two information switch fabrics;
   (d) generating a local check-code signal for an output information signal; and
   (e) comparing the output check-code signal to the local check-code signal to select one of the two output information signals as an output signal corresponding to the input information signal.

10. The invention of claim 9, wherein:
   step (d) comprises the step of generating a local check-code signal for each of the two output 3 information signals; and
   step (e) comprises the step of comparing the output check-code signal to the two local check-code signals to select one of the two output information signals as the output signal corresponding to the input information signal.

11. The invention of claim 9, wherein:
   the two information switch fabrics are optical switch fabrics; and
   the code switch fabric is an electrical switch fabric.

12. The invention of claim 9, wherein:
   the input check-code signals for two or more different input information signals are multiplexed together for transmission to the code switch fabric over a single input cable; and
   the output check-code signals for two or more different information signals are multiplexed together for transmission from the code switch fabric over a single output cable.

13. The invention of claim 9, wherein two or more input check-code signals are shuffled together prior to routing through the code switch fabric.

14. The invention of claim 9, wherein different signals are differently delayed to account for differences in distance to and from the switch fabrics.

15. The invention of claim 9, wherein:
   step (d) comprises the step of generating a local check-code signal for each of the two output information signals;
   step (e) comprises the step of comparing the output check-code signal to the two local check-code signals to select one of the two output information signals as the output signal corresponding to the input information signal;
   the two information switch fabrics are optical switch fabrics;
   the code switch fabric is an electrical switch fabric;

the input check-code signals for two or more different input information signals are multiplexed together for transmission to the code switch fabric over a single input cable;

the output check-code signals for two or more different information signals are multiplexed together for transmission from the code switch fabric over a single output cable;

two or more input check-code signals are shuffled together prior to routing through the code switch fabric; and different signals are differently delayed to account for differences in distance to and from the switch fabrics.

* * * * *